(12) United States Patent
Zhu

(10) Patent No.: US 10,272,778 B2
(45) Date of Patent: Apr. 30, 2019

(54) METHOD AND SYSTEM FOR DETERMINING UNIT GAIN OF SPEED CONTROL FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 86 days.

(21) Appl. No.: 15/408,430

(22) Filed: Jan. 18, 2017

(65) Prior Publication Data

US 2018/0203450 A1   Jul. 19, 2018

(51) Int. Cl.
*B60K 31/00* (2006.01)
*B60W 30/14* (2006.01)
*B60W 50/00* (2006.01)

(52) U.S. Cl.
CPC ........... *B60K 31/00* (2013.01); *B60W 30/143* (2013.01); *B60K 2310/24* (2013.01); *B60K 2310/244* (2013.01); *B60W 2050/0089* (2013.01); *B60W 2550/404* (2013.01); *B60W 2720/10* (2013.01)

(58) Field of Classification Search
CPC ................................ G05D 1/021; B60K 31/00
See application file for complete search history.

*Primary Examiner* — Aaron L Troost
(74) *Attorney, Agent, or Firm* — Womble Bond Dickinson (US) LLP

(57) ABSTRACT

In one embodiment, speeds of an autonomous driving vehicle (ADV) are captured in response to a series of speed control commands issued at different points in time represented by a series of command cycles. For each of the command cycles, a first speed-changing rate is calculated based on a corresponding speed of the ADV and a second speed-changing rate is calculated based on the corresponding speed and a corresponding speed control command using a predetermined algorithm or function. A unit gain of speed control is determined using a cost function based on the first speed-changing rates and the second speed-changing rates, such that the cost representing a difference between the first speed-changing rates and the second speed-changing rates. The unit gain is then utilized to generate subsequent speed control commands for operating the ADV.

22 Claims, 9 Drawing Sheets

| Timestamp/Command Cycles 401 | T1 | T2 | T3 | T4 | T5 | ... | Tn |
|---|---|---|---|---|---|---|---|
| Throttle Percentages 402 | 18% | 19% | 30% | 40% | 40% | ... | |
| Vehicle Speed 403 | 3.1 | 3.3 | 4.3 | 5.8 | 7.2 | ... | |
| Acceleration (one command cycle delay) 404 | N/A | 0.2 | 1 | 1.5 | 1.4 | ... | |
| Acceleration (two command cycle delay) 405 | N/A | N/A | 0.6 | 1.25 | 1.45 | ... | |

FIG. 4

METHOD AND SYSTEM FOR DETERMINING UNIT GAIN OF SPEED CONTROL FOR AUTONOMOUS DRIVING VEHICLES

TECHNICAL FIELD

Embodiments of the present invention relate generally to operating autonomous vehicles. More particularly, embodiments of the invention relate to determining a unit gain of speed control of an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

In addition, speed control is a critical step in autonomous driving. From time to time, a unit gain of the vehicle throttle and brake units needs to be calibrated and adjusted under different circumstances (e.g., road condition, weather condition, vehicle weight). However, the behaviors of autonomous driving vehicles vary from vehicle to vehicle and from time to time. It is difficult and time consuming to collect throttle and brake behavioral information and determine the unit gain.

BRIEF DESCRIPTION OF THE DRAWINGS

Embodiments of the invention are illustrated by way of example and not limitation in the figures of the accompanying drawings in which like references indicate similar elements.

FIG. 4 shows a data structure illustrating a process of determining speed changing rates of an autonomous driving vehicle according to one embodiment of the invention.

DETAILED DESCRIPTION

Figure 1:
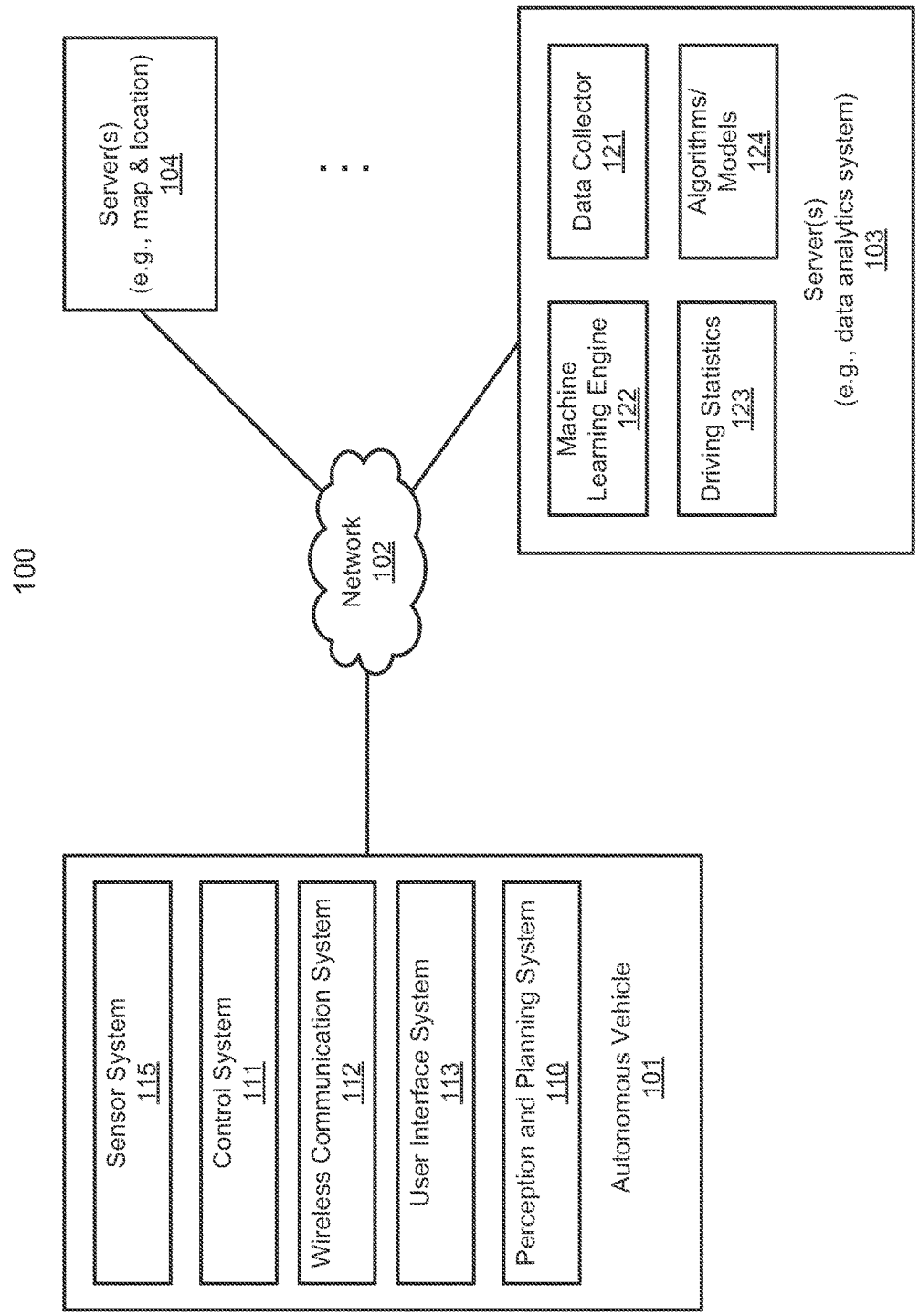
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, as vehicle status could be different (e.g., number of passengers, gas level, weather, etc.), data collection is performed each time the vehicle operates in order to collect correct data for the current vehicle status. The data can be collected from recording manual driving data or from collecting commanded auto-driving results. The manual driving data (e.g., driven by a human driver in a manual driving mode) may be used to train a model or cost function to determine a unit gain of throttling or braking. The auto-driving results can be used to validate the model or cost function. The collected data, also referred to as driving statistics data, may be a time-series data that contains timestamps, current vehicle speeds, and current throttle/brake commands. The current acceleration or deceleration may be derived from the collected data. Based on the driving statistics data (e.g., timestamps, speeds), the actual acceleration or deceleration can be calculated. The projected acceleration or deceleration can be estimated using a predetermined algorithm or function. The predetermined algorithm includes a unit gain as a parameter or coefficient to model or mirror the actual acceleration or deceleration rates. The unit gain of the predetermined algorithm or function is determined using a cost function, such that a cost representing the difference between the actual acceleration/deceleration and the projected acceleration/deceleration at different points in time reaches minimum. The unit gain can then be utilized to generate subsequent speed control commands for operating the autonomous vehicle.

In one embodiment, speeds of an autonomous driving vehicle (ADV) are captured in response to a series of speed control commands issued at different points in time represented by a series of command cycles. For each of the command cycles, a first speed-changing rate is calculated based on a corresponding speed of the ADV and a second speed-changing rate is calculated based on a corresponding speed control command using a predetermined algorithm or function. A unit gain of speed control is determined using a cost function based on the first speed-changing rates and the second speed-changing rates, such that the cost representing a difference between the first speed-changing rates and the second speed-changing rates reaches minimum. The unit gain is then utilized to generate subsequent speed control commands for operating the ADV.

A speed control command refers to a throttle command or a brake command, for example, in a form of percentage of a maximal value, referred to as a throttle percentage or brake percentage. A speed-changing rate refers to an acceleration rate in response to a throttle command or a deceleration rate in response to a brake command. A command cycle refers to a time period during which a control command will be issued. A command cycle represents how frequently a control command will be issued. For example, if a control command is issued for every 0.1 second, the time period of 0.1 second is referred to as a command cycle. A unit gain refers to a gain or a coefficient that is utilized in determining the speed changing rate, i.e., the acceleration or deceleration in view of the throttle or brake commands. Given a unit gain, if the system expects the vehicle to accelerate and decelerate, a proper throttle or brake command can be determined based on the expected speed changing rate and the unit gain. Similarly, if a specific speed control command is issued, the expected speed (or change of the speed) of the vehicle can be determined based on the unit gain and the speed control command.

Under different driving circumstances or environments of a particular vehicle (e.g., road condition, vehicle weight, weather condition, etc.), the unit gain may be different at different points in time. Embodiments of the invention are to allow the vehicle to be driven for a period of time and the driving statistics data can be collected during the period of time. Based on the driving statistics data, a unit gain is determined in real-time by applying the driving statistics to a unit gain determination or predictive model or function. The unit gain can be utilized to determine subsequent speed control commands (e.g., throttle or brake percentage) for that particular trip or driving environment.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
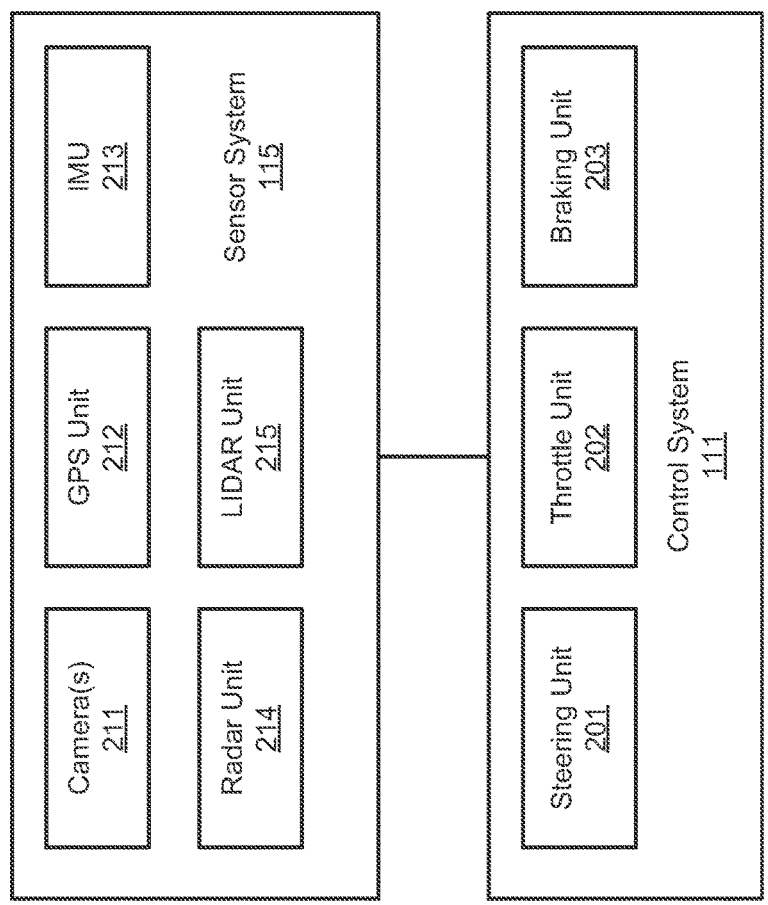
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 performs or trains a set of rules, algorithms, and/or predictive models 124 for a variety of purposes. In one embodiment, models 124 may include a unit gain determination model or unit gain cost function for the purpose of determining a unit gain of speed control of a particular vehicle. Such model or cost function is specifically learned and trained for a particular vehicle or a particular type of vehicles based on their respective driving statistics. The unit gain determination model or cost function may be created by machine learning engine 122 by "learning" driving statistics 123. The unit gain determination model or cost function can then be utilized in real-time to determine a speed control unit gain and the unit gain is utilized to generate speed control commands subsequently.

Figure 3:
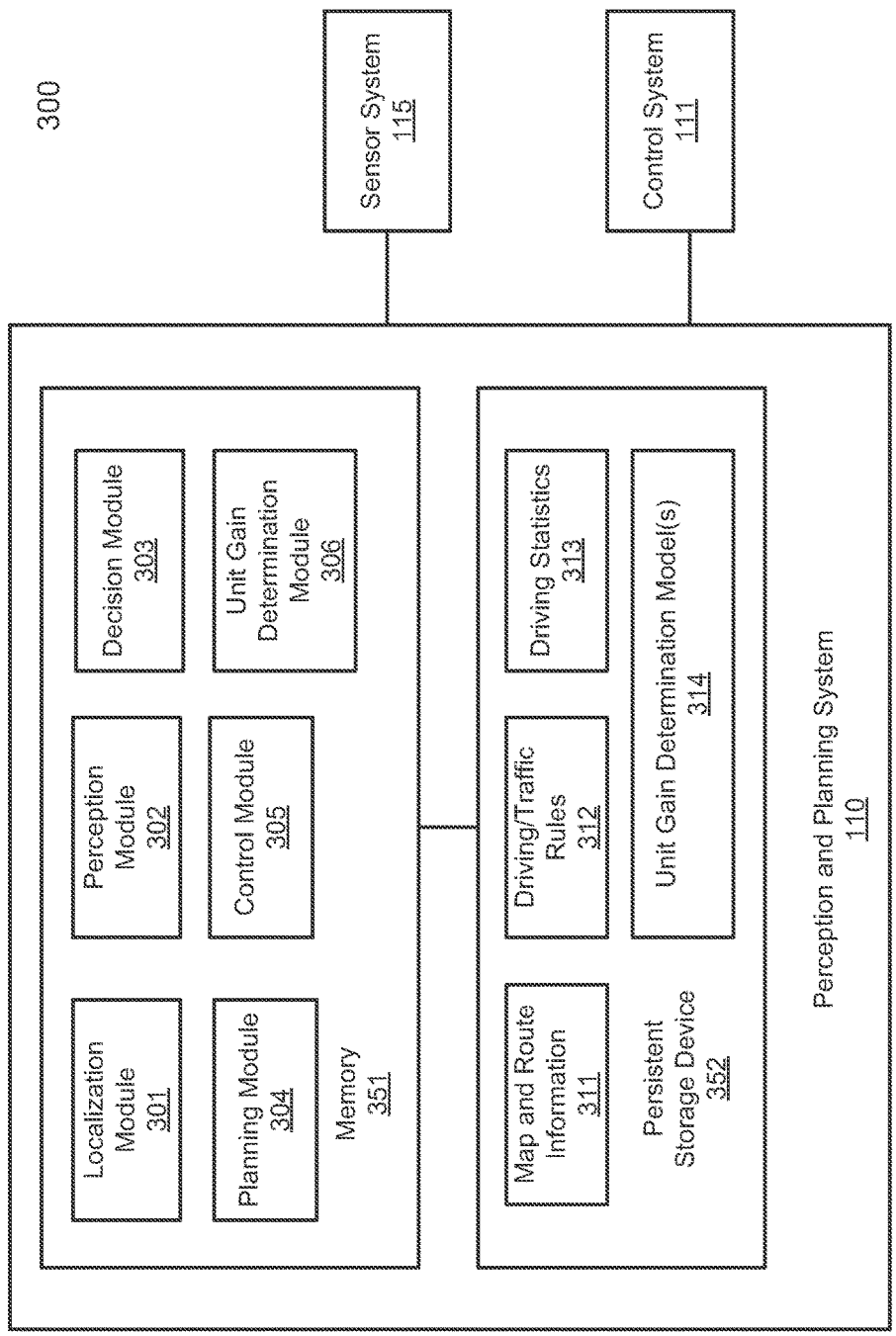
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, and unit gain determination module 306.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may determine a location of the vehicle based on location and route information, which may be received from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, control module 305 includes a speed control module (not shown). The speed control module is configured to control the speed of the vehicle. Based on planning and control data provided by planning module 304, the speed control module generates a speed control command, such as throttle percentage or brake percentage for a throttle or brake command. In one embodiment, the speed control module utilizes a unit gain parameter to determine a speed control command for a next command cycle. For example, based on a given target speed or target acceleration of a vehicle at a certain point in time, the speed control module determines a throttle command with a specific throttle percentage using the unit gain.

As described above, a unit gain for different vehicles may be different. A unit gain may be different for a particular vehicle driving under different driving conditions or environments. In one embodiment, for a given driving environment, unit gain determination module 306 is configured to dynamically determine a unit gain for speed control of the vehicle based on the driving statistics data collected at the point in time. In one embodiment, the unit gain may be configured to an initial unit gain value, for example, by machine learning engine 122 based on driving history. When the vehicle is driven at real-time, either in a manual driving mode or an autonomous mode, driving statistics data 313 can be collected. Driving statistics data 313 includes speed control commands (e.g., throttle, brake commands) issued at different points in time and speeds of the vehicles captured and recorded at different points in time in response to the speed control commands.

An example of driving statistics 313 is shown in FIG. 4. Referring to FIG. 4, throttle commands 402 issued in different command cycles 401 are recorded. For each of the command cycles 401, vehicle's speeds 403 are captured. Based on vehicle's speeds 403 in different command cycles 401, assuming the command delay is one command cycle, accelerations 404 can be derived, for example, based on the difference between the speeds of two command cycles divided by the command delay, in this example, one command cycle delay. For example, acceleration for command cycle T2 can be determined as 0.2 by the difference between speeds obtained at T2 and T1 (3.3−3.1) divided by the command delay (1). Similarly, if the command delay is two-command cycle delay, the actual accelerations 405 at different points in time 401 can be derived. For example, the acceleration at T3 with a two-command cycle delay can be determined as (4.3−3.1)/2=0.6. A command delay refers to a time delay between issuing a control command (e.g., throttle command) and a response or reaction from the vehicle (e.g., acceleration). Similarly, deceleration can be determined using a similar process based on the speeds and brake commands.

In one embodiment, the command delay for a particular vehicle or a type of the vehicles can be determined based on the driving statistics of the vehicles. Specifically, driving statistics of various autonomous vehicles (also referred to as autonomous driving vehicles or ADVs) of a particular type or category are collected over a period of time, where the driving statistics may be captured and recorded by a processing logic of each ADV while the ADV was driven, autonomously or manually by a human driver. The driving statistics may include information concerning the driving commands (e.g., throttle, brake, or steering command), the time of issuing such driving commands, vehicle behaviors at different points in time (e.g., in response to the driving commands), and/or a response of the vehicle derived from the vehicle behaviors at different points in time.

A list of the predetermined command delay candidates for the ADV is determined or defined. Each command delay candidate is represented by one or more command cycles. For each of the command delay candidates, a percentage of driving commands (e.g., throttle, brake, or steering commands) is calculated, which resulted in a response of the ADV conforming to the driving commands associated with the command delay candidate in question. After all of the percentages of the responses conforming to the driving commands for all command delay candidates have been determined, a command delay candidate having the highest percentage is selected as the command delay for the particular type of the ADV. Thereafter, the command delay can be utilized to generate planning and control data for controlling and driving an ADV of the same or similar type. Further detailed information concerning the techniques of determining command delays can be found in co-pending U.S. patent application Ser. No. 15/360,717, entitled "Method for Determining Command Delays of Autonomous Vehicles," filed Nov. 23, 2016, which is incorporated by reference herein in its entirety.

Referring back to FIG. 3, driving statistics 313 are then fed into unit gain determination model 314 to determine a unit gain for the vehicle under the circumstances. In one embodiment, speeds of an autonomous driving vehicle (ADV) are captured as part of driving statistics 313 in response to a series of speed control commands issued at different points in time represented by a series of command cycles. For each of the command cycles, a first speed-changing rate (e.g., acceleration or deceleration) is calculated based on a corresponding speed of the ADV. A second speed-changing rate is calculated based on a corresponding speed control command using a predetermined algorithm or function. The predetermined algorithm includes a unit gain as a parameter or coefficient to model or simulate the actual acceleration or deceleration rates. A unit gain of predetermined algorithm is determined using a cost function based on the first speed-changing rates and the second speed-changing rates, such that a difference (e.g., cost) between the first speed-changing rates and the second speed-changing rates over the command cycles reaches minimum. The unit gain is then utilized to generate subsequent speed control commands for operating the ADV.

In mathematical optimization, statistics, decision theory, and machine learning, a loss function or cost function is a function that maps an event or values of one or more variables onto a real number intuitively representing some "cost" associated with the event. An optimization problem seeks to minimize a loss function. In statistics, typically a loss function is used for parameter estimation, and the event in question is some function of the difference between estimated and true values for an instance of data. Parameter estimation for supervised learning tasks such as regression or classification can be formulated as the minimization of a loss function over a training set. The goal of estimation is to find a function that models its input well: if it were applied to the training set, it should predict the values (or class labels) associated with the samples in that set. The loss function quantifies the amount by which the prediction deviates from the actual values.

In one embodiment, a predetermined algorithm or function is utilized to estimate a speed changing rate based on driving statistics data 313 as a training set. One of the parameters of the algorithm is a unit gain used to determine the speed changing rate based on the speed control command values. The actual speed changing rates (e.g., acceleration, deceleration) over a period of time can be derived from driving statistics 313. A cost function is then invoked to estimate the unit gain of the algorithm, such that the cost representing the difference of the actual acceleration/deceleration and the estimated acceleration/deceleration is minimized. When the cost function reaches minimum, its parameter, i.e., a unit gain of the predetermined algorithm that estimates the speed changing rate, can be determined.

Figure 5:
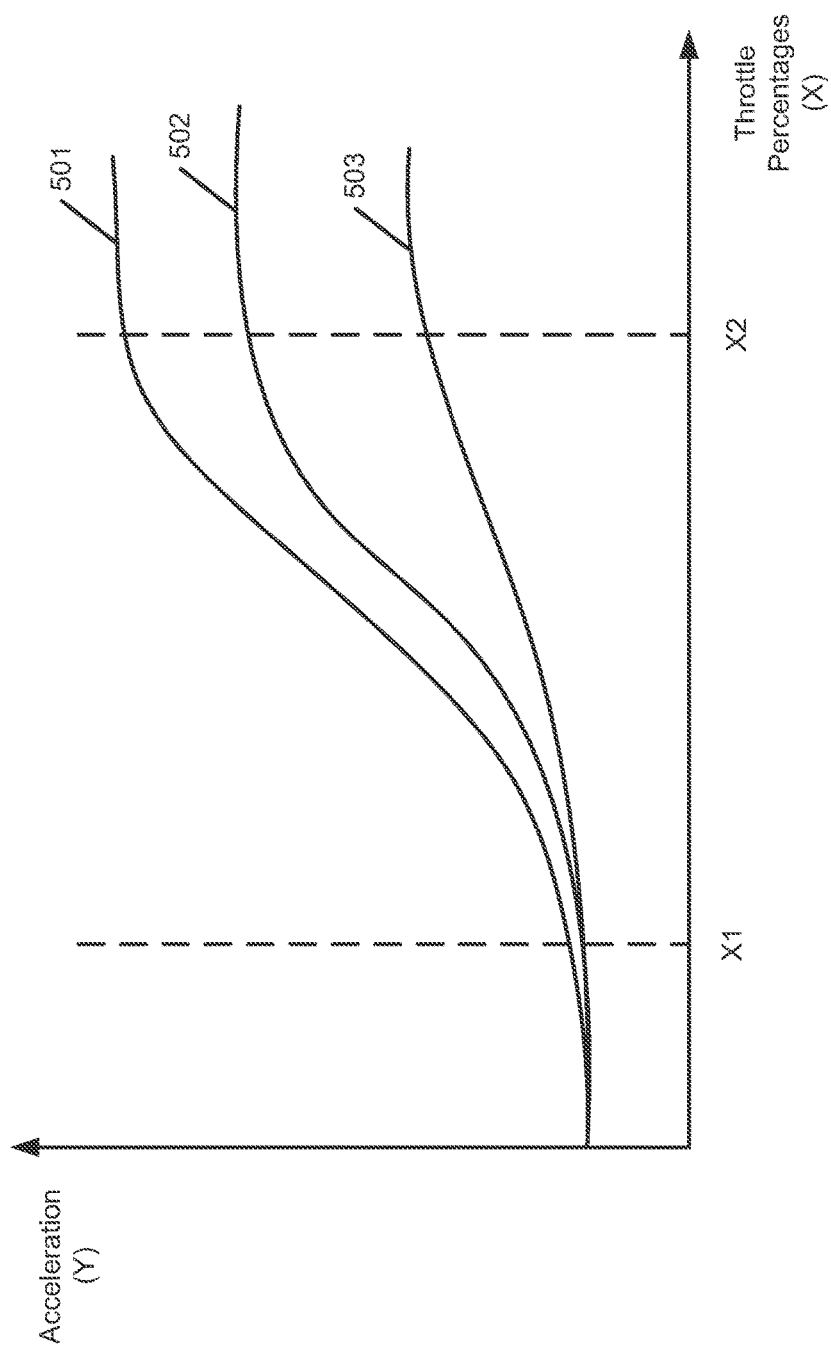
FIG. 5 is a diagram illustrating vehicle acceleration curves under different driving environments according to one embodiment of the invention.

FIG. 5 is a diagram illustrating vehicle acceleration curves under different driving environments according to one embodiment of the invention. Referring to FIG. 5, acceleration (Y) represents the actual acceleration of a vehicle in response to a throttle command (X). Typically, when the throttle percentage is less than a certain threshold, in this example, a first threshold (X1), the acceleration of the vehicle tends to remain flat. That is because due to the weight of the vehicle or other factors (e.g., road condition, weather condition), the vehicle initially would not accelerate dramatically. Similarly, when throttle percentage is greater than a certain threshold, in this example, a second threshold (X2), the acceleration of the vehicle remains flat. The reason is that after certain throttle level, the vehicle cannot accelerate any more due to the weight of the vehicle or other factors (e.g., road condition, weather condition, wind resistance). The areas from zero to X1 and greater than X2 are referred to as dead zone in terms of acceleration, as the acceleration would not change much.

However, in the area between X1 and X2, the acceleration of the vehicle changes dependent upon the specific driving condition. In this example, acceleration curves 501-503 represent different actual accelerations (Y) of the vehicle in response to different throttle commands (X). The actual accelerations can be derived from the speeds of the vehicle at different points in time in response to the throttle commands. In this example, the unit gain of speed control for acceleration curve 501 is higher than acceleration curve 502, which is higher than acceleration curve 503.

Figure 6:
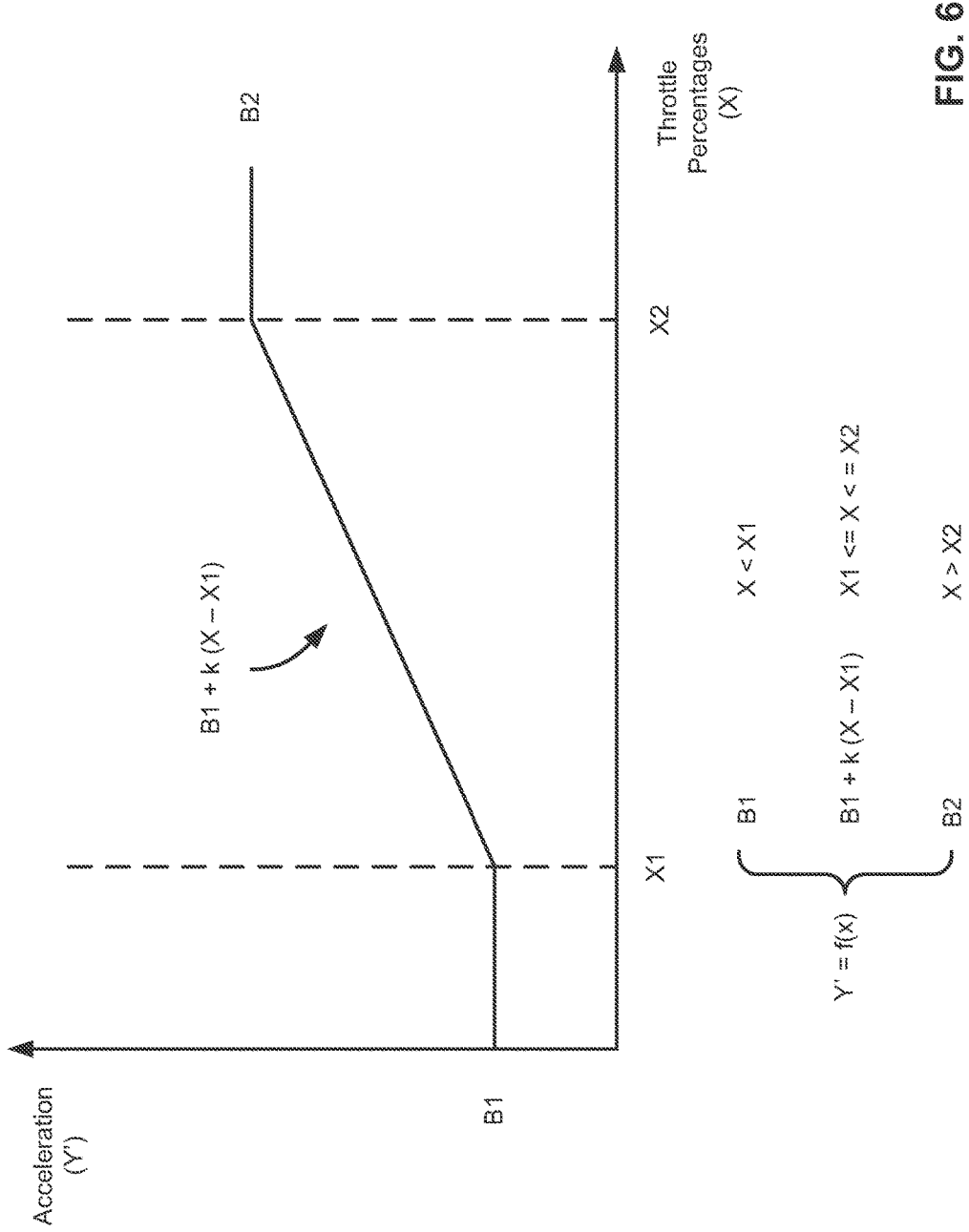
FIG. 6 is a diagram illustrating an example of an algorithm to estimate a speed changing rate based on a speed control command according one embodiment of the invention.

As described above, in response speed control commands such as throttle commands, the same vehicle may react, i.e., accelerate, differently under different circumstances. For example, a vehicle having more passengers may accelerate slower or less because it weights heavier, and thus its unit gain is lower. If the vehicle travels on a rough road or slippery road due to weather condition, its acceleration rate may be lower and thus its unit gain may be lower. Similarly, the unit gain of a vehicle moving against the wind may be lower. The acceleration of the vehicle may also vary due to other vehicle characteristics, such as tire pressure and the current speed at the time or wind resistance due to the structure or shape of the vehicle. The vehicle's reactions may be affected by these factors, which may affect the subsequent speed control decisions. By dynamically determining a unit gain for a particular driving environment, the subsequent speed control commands can be issued properly for that particular driving environment. Driving environment refers to a combination of one or more of a particular vehicle with particular number of passengers, road condition, weather condition, tire pressure, etc., FIG. 6 is a diagram illustrating an example of an algorithm to estimate a speed changing rate based on a speed control command according one embodiment of the invention. Referring to FIG. 6, the algorithm as shown can be utilized to project or estimate a speed changing rate, which can be compared to the actual speed changing rate in order to determine a unit gain using a cost function as described above. In this example, the function f(x) used to estimate the acceleration (Y') based on throttle commands (X) may be modeled and created offline, for example, by machine learning engine 122 based on driving statistics history of the same or similar vehicles.

In one embodiment, if the throttle command (x) is less than X1 (e.g., dead zone), the acceleration Y' is assigned with a first predetermined threshold or value, in this example, B1. If the throttle command (x) is greater than X2 (e.g., dead zone), the acceleration Y' is assigned with a second predetermined threshold or value, in this example, B2. If the throttle command (x) is greater than or equal to X1 and less than or equal to X2, the speed changing rate Y' can be calculated as a product of a unit gain and the speed control value (e.g., throttle command value representing a throttle percentage). In a particular embodiment, the speed changing rate (Y') is a product of a unit gain and the difference between the speed control value and the first predetermined threshold (X1). In one embodiment, function f(x) can be determined as follows:

$$Y'=f(x)=B1+k(x-X1)$$

Figure 7:
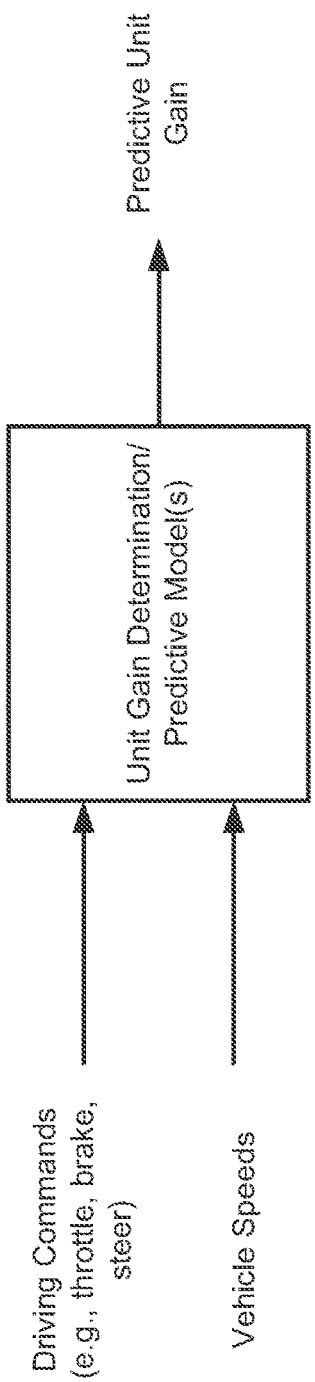
FIG. 7 is a diagram illustrating a process of determining a unit gain using a predictive model according to one embodiment of the invention.

Here coefficient (k) is referred to as a unit gain. Once the estimated accelerations Y' for all command cycles have been estimated using the above formula, a cost function is invoked to determine the unit gain (k) such that the difference between the actual acceleration (Y) and the estimated acceleration (Y') over the command cycles reaches minimum. In one embodiment, the cost function is a least square function that can be defined as follows:

$$\min \Sigma_0^{N-1}(Y-Y')^2$$

where N represents a number of command cycles involved. In one embodiment, the techniques described above can be implemented in a unit gain determination or predictive model as shown in FIG. 7, which can be implemented as a linear, polynomial steps, or exponential function. The unit gain determination model may be created and trained offline, for example, by machine learning engine 122 of data analytics system 103. The driving statistics can be fed into the unit gain determination model and the model will produce the predicted unit gain using some of the techniques described above.

Figure 8:
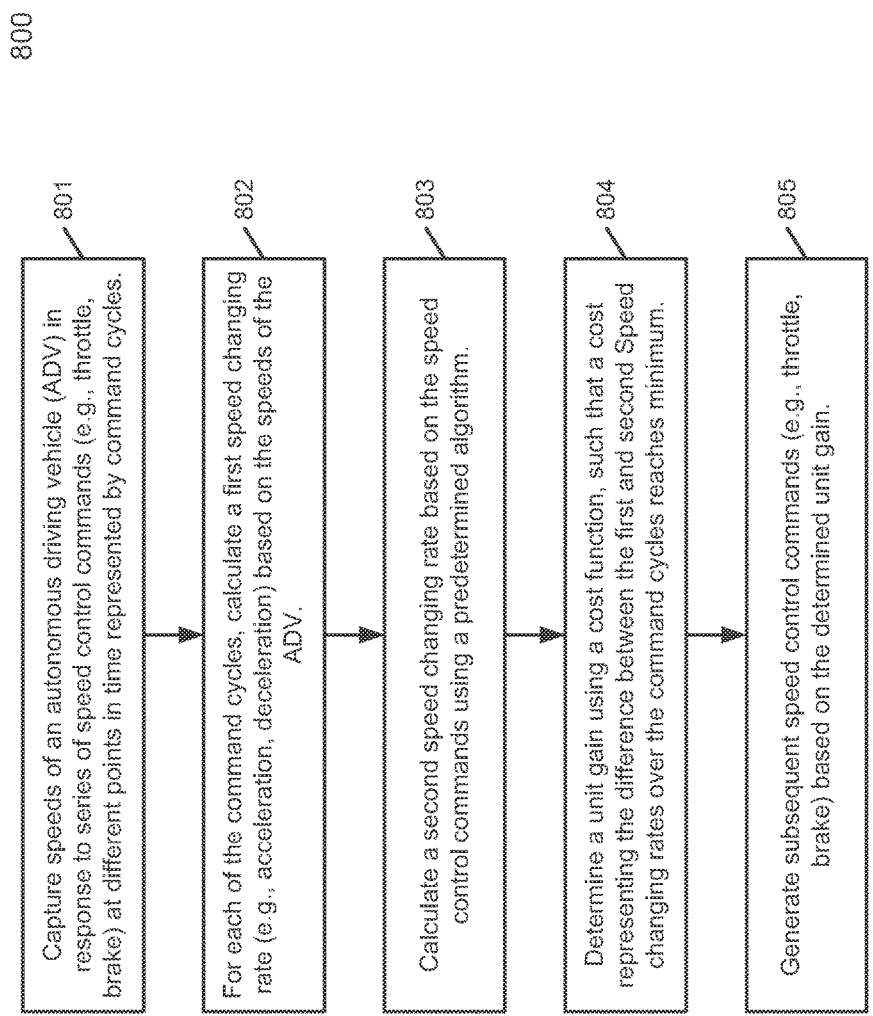
FIG. 8 is a flow diagram illustrating a process of determining a unit gain according to one embodiment of the invention.

FIG. 8 is a flow diagram illustrating a process of determining a unit gain for speed control of an autonomous vehicle according to one embodiment of the invention. Process 800 may be performed by processing logic which may include software, hardware, or a combination thereof. For example, process 800 may be performed by unit gain determination module 306. Referring to FIG. 8, in operation 801, processing logic captures speeds of an autonomous driving vehicle as part of driving statistics in response to a series of speed control commands (e.g., throttle, brake commands) at different points in time represented by command cycles. The vehicle may be driven in a manual driving mode or autonomous driving mode. In operation 802, for each of the command cycles, processing logic calculates a first speed changing rate (e.g., an actual speed changing rate such as acceleration or deceleration) based on the speeds of the autonomous driving vehicle at different points in time. In operation 803, processing logic calculates a second speed changing rate (e.g., estimated or predicted speed changing rate) based on the speed control commands using a predetermined algorithm or function. In operation 803, processing logic invokes a cost function to determine a unit gain for speed control based on the first and second speed changing rates, such that a cost representing the difference between the first speed changing rates and the second speed changing rates over a series of command cycles reaches minimum. In operation 805, processing logic generates subsequent speed control commands based on the determined unit gain.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
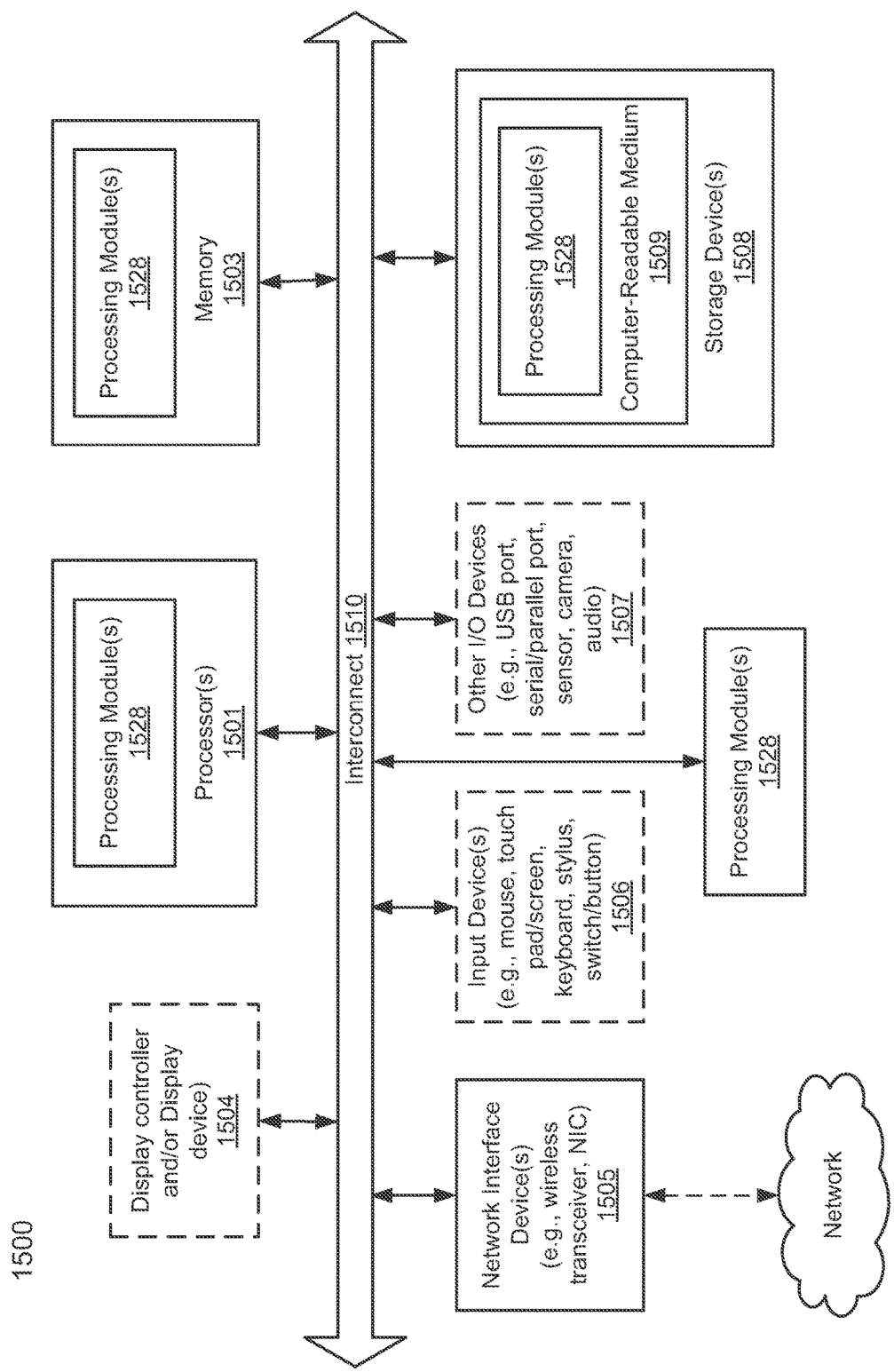
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304, control module 305, and/or unit gain determination module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining a unit gain of speed control of an autonomous driving vehicle, the method comprising:
    capturing speeds of the autonomous driving vehicle (ADV) in response to a plurality of speed control commands at different points in time represented by a plurality of command cycles;
    for each of the command cycles,
        calculating a first speed-changing rate based on the captured speeds of the ADV associated with the command cycle, and
        calculating a second speed-changing rate based on a corresponding speed control command using a predetermined algorithm;
    determining using a cost function a unit gain of speed control based on the first and second speed-changing rates, such that a cost representing a difference between the first and second speed-changing rates reaches minimum, wherein the unit gain is utilized to generate subsequent speed control commands; and
    controlling the ADV based on the generated speed control commands.

2. The method of claim 1, wherein the first speed-changing rate for a first command cycle is calculated based on a vehicle speed measured at the first command cycle in response to a speed control command issued on a second command cycle.

3. The method of claim 2, wherein a difference between the first command cycle and the second command cycle represents a command delay associated with the ADV.

4. The method of claim 1, wherein the cost function calculates the second speed-changing rate at a particular command cycle based on a product of the unit gain and a speed control value representing a speed control command corresponding to the particular command cycle.

5. The method of claim 4, further comprising:
    setting the second speed-changing rate to a first predetermined speed-changing rate if the corresponding speed control value is less than a first predetermined threshold; and setting the second speed-changing rate to a second predetermined speed-changing rate if the corresponding speed control value is greater than a second predetermined threshold.

6. The method of claim 5, further comprising setting the second speed-changing rate to a product of the unit gain and a different between the speed control value and the first predetermined threshold.

7. The method of claim 1, wherein determining a unit gain of acceleration based on the first and second speed-changing rates comprises minimizing a least square cost function based on the difference between the first and second speed-changing rates.

8. The method of claim 7, wherein minimizing a least square cost function based on the difference between the first and second speed-changing rates is performed over a plurality of command cycles.

9. A non-transitory machine-readable medium having instructions stored therein, which when executed by a processor, cause the processor to perform operations, the operations comprising:
  capturing speeds of an autonomous driving vehicle (ADV) in response to a plurality of speed control commands at different points in time represented by a plurality of command cycles;
  for each of the command cycles,
    calculating a first speed-changing rate based on the captured speeds of the ADV associated with the command cycle, and
    calculating a second speed-changing rate based on a corresponding speed control command using a predetermined algorithm;
  determining using a cost function a unit gain of speed control based on the first and second speed-changing rates, such that a cost representing a difference between the first and second speed-changing rates reaches minimum, wherein the unit gain is utilized to generate subsequent speed control commands; and
  controlling the ADV based on the generated speed control commands.

10. The machine-readable medium of claim 9, wherein the first speed-changing rate for a first command cycle is calculated based on a vehicle speed measured at the first command cycle in response to a speed control command issued on a second command cycle.

11. The machine-readable medium of claim 10, wherein a difference between the first command cycle and the second command cycle represents a command delay associated with the ADV.

12. The machine-readable medium of claim 9, wherein the cost function calculates the second speed-changing rate at a particular command cycle based on a product of the unit gain and a speed control value representing a speed control command corresponding to the particular command cycle.

13. The machine-readable medium of claim 12, wherein the operations further comprise:
  setting the second speed-changing rate to a first predetermined speed-changing rate if the corresponding speed control value is less than a first predetermined threshold; and
  setting the second speed-changing rate to a second predetermined speed-changing rate if the corresponding speed control value is greater than a second predetermined threshold.

14. The machine-readable medium of claim 13, wherein the operations further comprise setting the second speed-changing rate to a product of the unit gain and a different between the speed control value and the first predetermined threshold.

15. The machine-readable medium of claim 9, wherein determining a unit gain of acceleration based on the first and second speed-changing rates comprises minimizing a least square cost function based on the difference between the first and second speed-changing rates.

16. The machine-readable medium of claim 15, wherein minimizing a least square cost function based on the difference between the first and second speed-changing rates is performed over a plurality of command cycles.

17. A data processing system, comprising:
  a processor; and
  a memory coupled to the processor to store instructions, which when executed by the processor, cause the processor to perform operations, the operations including
    capturing speeds of an autonomous driving vehicle (ADV) in response to a plurality of speed control commands at different points in time represented by a plurality of command cycles,
    for each of the command cycles,
      calculating a first speed-changing rate based on the captured speeds of the ADV associated with the command cycle, and
      calculating a second speed-changing rate based on a corresponding speed control command using a predetermined algorithm,
    determining using a cost function a unit gain of speed control based on the first and second speed-changing rates, such that a cost representing a difference between the first and second speed-changing rates reaches minimum, wherein the unit gain is utilized to generate subsequent speed control commands, and
    controlling the ADV based on the generated speed control commands.

18. The system of claim 17, wherein the first speed-changing rate for a first command cycle is calculated based on a vehicle speed measured at the first command cycle in response to a speed control command issued on a second command cycle.

19. The system of claim 18, wherein a difference between the first command cycle and the second command cycle represents a command delay associated with the ADV.

20. The system of claim 17, wherein the cost function calculates the second speed-changing rate at a particular command cycle based on a product of the unit gain and a speed control value representing a speed control command corresponding to the particular command cycle.

21. The system of claim 20, wherein the operations further comprise:
  setting the second speed-changing rate to a first predetermined speed-changing rate if the corresponding speed control value is less than a first predetermined threshold; and
  setting the second speed-changing rate to a second predetermined speed-changing rate if the corresponding speed control value is greater than a second predetermined threshold.

22. The system of claim 21, wherein the operations further comprise setting the second speed-changing rate to a product of the unit gain and a different between the speed control value and the first predetermined threshold.

* * * * *